J. HEJL.
ICE CREAM FREEZER.
APPLICATION FILED JULY 13, 1915.

1,184,237.

Patented May 23, 1916.

Inventor
J. Hejl
By A. M. Wilson,
Attorney

UNITED STATES PATENT OFFICE.

JAMES HEJL, OF OVID, MICHIGAN.

ICE-CREAM FREEZER.

1,184,237. Specification of Letters Patent. Patented May 23, 1916.

Application filed July 13, 1915. Serial No. 39,636.

*To all whom it may concern:*

Be it known that I, JAMES HEJL, a citizen of the United States, residing at Ovid, in the county of Clinton and State of Michigan, have invented certain new and useful Improvements in Ice-Cream Freezers, of which the following is a specification.

This invention relates to certain new and useful improvements in ice cream freezers.

An object of the invention is to provide an ice cream freezer including an inner and outer receptacle in which the inner receptacle is adapted to be oscillated by hand to cause the contents thereof to be agitated and frozen by ice and brine contained within the outer receptacle.

A further object of the invention is to provide an ice cream freezer in which the inner container for the cream may be oscillated by hand while the outer container receives ice and brine with an annular weight constituting a follower resting on the ice to cause the same to be tightly packed around and beneath the inner container.

With these general objects in view and others that will appear as the nature of the invention is better understood, the same consists in the novel construction, combination and arrangement of parts hereinafter more fully described, illustrated in the accompanying drawings, and pointed out in the appended claim.

Figure 1:
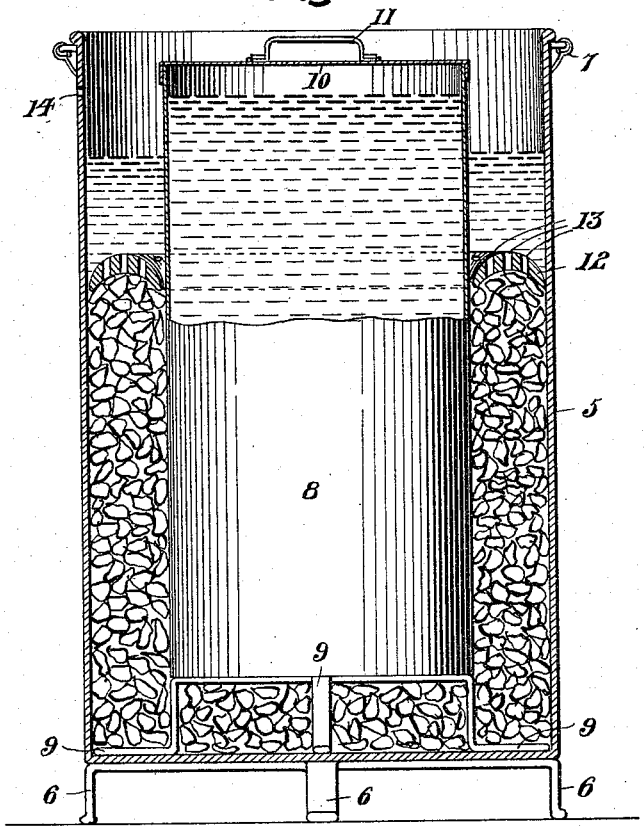
Figure 2:
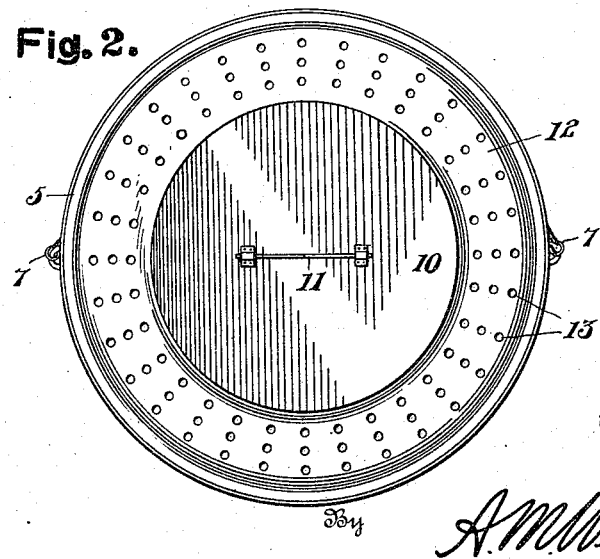

In the drawings forming a part of this application and in which like designating characters refer to corresponding parts throughout the several views:—Figure 1 is a vertical cross-sectional view of an ice cream freezer built in accordance with the present invention, and, Fig. 2 is a top plan view thereof.

Briefly described, the present invention aims to provide an ice cream freezer that is extremely simple in construction and inexpensive to manufacture, the same including an inner and outer receptacle, with a support within the outer receptacle upon which the inner receptacle is mounted. The support within the outer receptacle affords a space beneath the inner receptacle to accommodate ice which also is filled between the walls of the two receptacles and upon which ice an annular weight or follower is positioned. The follower is provided with a plurality of perforations to permit the brine to rise above the same, thereby to cause the ice to be tightly packed about the inner container.

Referring more in detail to the accompanying drawing, the reference numeral 5 indicates an outer receptacle of the form preferably as shown, being cylindrical in cross-section and mounted upon supporting feet 6. A lifting bail 7 is secured to the upper end of the receptacle 5 by which the same may be transported as desired.

The inner receptacle is designated 8 and is of the same shape as the outer receptacle, the same being seated upon a suitably formed stand 9 as shown in Fig. 1 including horizontal supporting members and laterally projecting feet. A cover 10 including peripheral flanges is received on the upper end of the container and frictionally engages the same and prevents the brine and ice contained within the outer receptacle from entering the inner receptacle, a handle 11 being carried by the cover 10 and by which the inner receptacle 8 may be oscillated within the outer receptacle, relative movement of the receptacle 8 and cover 10 being prevented by the frictional contact between the parts.

As shown in Fig. 1, ice is placed within the outer receptacle and is forced beneath the inner receptacle and is held in compact condition by the annular weight or follower 12. The follower 12 is provided with a plurality of perforations 13 to permit the brine resulting from the ice and salt to pass upwardly through the follower and surround the inner receptacle 8 as is shown. An overflow opening 14 is provided in the outer receptacle 5 adjacent the upper end thereof so that in case the brine rises to a height adjacent the upper end of the inner receptacle, the same may readily flow therefrom, thereby to prevent the brine from entering the inner receptacle.

From the above detailed description of the invention, it is believed that the operation thereof will be readily apparent, it being noted that the follower 12, being in the form of a weighted annulus resting on the ice, will force the ice into compact condition while the inner receptacle 8 is oscillated within the outer receptacle 5 and upon the support 9 by the cover handle 11. The follower 12 may be formed to meet certain requirements and as shown the same is of crescent shape in cross-section, better to prevent the ice within the receptacle 5 from rising above the same.

While the form of the invention herein shown and described is what is believed to be a preferable embodiment thereof, it is nevertheless to be understood that various forms, modifications and arrangements of the parts may be made without departing from the spirit and scope of the invention as claimed.

What I claim as new is:—

The combination with an outer receptacle and an inner receptacle movably mounted therein, of a weighted annular ring constituting a follower positioned within the outer receptacle and surrounding the inner receptacle, the said ring being crescent-shaped in cross-section to provide thin inner and outer edges arranged adjacent the inner and outer receptacles respectively to prevent ice packed beneath the follower from rising upwardly, the said follower having a plurality of perforations therein to permit the brine within the outer receptacle to rise above the same.

In testimony whereof I affix my signature.

JAMES HEJL.

Copies of this patent may be obtained for five cents each, by addressing the "Commissioner of Patents, Washington, D. C."